United States Patent Office 2,872,388
Patented Feb. 3, 1959

2,872,388

NUCLEAR FUEL ELEMENTS AND METHODS FOR MAKING SAME

Frederick Fahnoe, Morristown, and James J. Shyne, Arlington, N. J., assignors, by mesne assignments, to the United States of America as represented by the United States Atomic Energy Commission No Drawing. Application July 30, 1954
Serial No. 446,952

10 Claims. (Cl. 204—1.5)

Our invention relates to nuclear fuel structures and methods for constructing the same.

A nuclear fuel element or sandwich comprises a metal cladding structure in which is imbedded a core of fissionable material such as uranium, plutonium, thorium and various compounds of these metals.

It is known to prepare such elements by mixing uranium and stainless steel particles together and compressing the mixture into a stainless steel billet. The billet is then rolled between two stainless steel members to produce a fuel sandwich which contains a uranium-stainless steel mixture clad between the two stainless steel sheets. These operations must be carried out with great precision and require extremely close tolerances in order to prevent structural changes which result in local overheating and subsequent melting of the cladding metal in conventional reactor operation. Moreover, the mixture must be completely sealed off within the sheets to prevent radioactive gases and waste products from escaping into the atmosphere. The billet compression and rolling operations create strains and malformations which make sealing, particularly end sealing, extremely difficult. Thus, the entire process is extremely difficult to perform; it requires special apparatus and machinery; it is costly, time consuming, and, indeed, not always successful.

Accordingly, it is an object of the present invention to provide new and improved processes and elements of the character indicated.

It is a further object to provide a new method for preparing fuel elements which makes use of electrophoretic deposition.

Still another object is to provide a fuel element which contains an electrophoretically deposited core of fissionable material.

Yet a further object is to provide a new method for preparing fuel elements by a cold forming technique.

A further object is to provide a fuel element whose cladding is composed at least in part by electrolytically deposited metal.

It is yet a further object to provide a new method for preparing fuel elements which eliminates or minimizes metallurgical processes such as rolling and swaging.

Our invention contemplates the electrophoretic deposition of fissionable material as a porous coating on a base plate of cladding metal. Bonding metal is then electrolytically deposited through the pores of the coating to bond the coating to the base plate. The deposition is then continued to first fill the pores and then to form a cladding layer on top of the bonded coating, thus producing a fuel element. As a first alternative, the base plate can be stripped away from the cladded coating and the exposed side of the coating can be electrolytically or chemically covered with bonding metal to form the element. As a second alternative, the deposition can be stopped at a point before the cladding layer is formed from bonding metal, and a second base plate can be placed as a cover over the bonded, but uncladded top surface.

Electrophoretic deposition occurs when an electrostatic field is established between two electrodes immersed within a colloidal or gross dispersion of charged particles, thus causing migration of the suspended particles toward one of the electrodes and producing the deposit of an adherent porous coating on that electrode. Exceptional uniformity of coating thickness and compacting (with an attendant relatively high coating density) are obtained as compared with dipping, spraying, brushing, and the other more conventional methods of application. Irregularly shaped objects of any desired contour can be coated with excellent uniformity and reproducibility of coating. This porous coating can then be bonded to the electrode by one of several different techniques.

Further details on the electrophoretic and bonding process will be found in our copendnig application S. N. 386,882, filed October 19, 1953, now Patent No. 2,848,391, granted August 19, 1958.

The following example sets forth well defined instances of the application of this invention. They are, however, not to be considered as limitations thereof, since many modifications may be made without departing from the spirit and scope of this invention.

*Example*

A 2% concentration by weight of mixed fissionable and unfissionable isotopes of uranium dioxide particles dispersed in isopropoyl alcohol was prepared in the manner outlined in the aforesaid copending application S. N. 386,882.

This dispersion was then poured into a conventional electrophoretic bath. A first stainless steel plate 1 inch by 4 inches by .025 inch was suspended in the dispersion and a second plate was also suspended in the dispersion opposite the first plate in such a manner that the plate surfaces were parallel. The plate separation was adjusted to 3 inches. A direct voltage of 2,000 volts was applied between the plates with such polarity that the first plate functioned as the cathode. The uranium dioxide particles immediately began to deposit in the surface of the first plate. After a 15-second interval, the first plate was disconnected and removed from the bath. The deposited porous coating attained a thickness of .001 inch during this interval.

The electrophoretically coated plate was then submerged in an electrolytic bath and connected as the plating electrode. A conventional nickel plating solution was used as the electrolyte. The current density was adjusted to 10 amperes per square foot. Nickel began to deposit through the pores of the uranium dioxide coating to bond the coating to the plate. The deposition was continued until the pores were completely filled and a surface of nickel was formed on top of the coating as a cladding layer.

The coated and cladded plate was then readjusted in position in order to nickel plate the edges of the coated and cladded plate and thus provide the completed fuel element. If desired, these edges can also be seam-welded to provide the desired end-sealing.

Before the electrophoretic operation, the surface of the first plate which is to receive the electrophoretic deposition can be masked about its periphery, or otherwise treated so that the peripheral areas will not be coated electrophoretically. After the uranium dioxide coating has been deposited, the uncoated areas can be unmasked or otherwise treated to receive an electrolytic deposit. Other techniques of masking are applicable as described in the above-mentioned copending application. Subsequent electrolytic deposition will then completely clad the coated plate without further adjustment of the plate in the electrolytic bath.

As a first alternative, the electrolytic deposition can be stopped at a point at which the pores of the uranium dioxide coating are filled with nickel but no cladding layer has been formed. A second stainless steel sheet can be placed over the uncladded but bonded coating and the resulting structure can be metallurgically treated in conventional manner to produce the desired element.

As a second alternative, the coating and its cladded layer of bonding metal can be stripped from the original steel plate, and the uncladded side of the coating can be coated with bonding metal by a second electrolytic deposition. Further details on the stripping operation will be found in the above-mentioned copending application.

By increasing the time of the electrophoretic deposit, coatings up to .002 inch in thickness have been prepared in one operation. Thicker coatings can be obtained by repeated electrophoretic deposit.

Cylindrically shaped elements can be obtained by replacing the plate electrodes with concentric cylindrical electrodes. Non-uniform tapering coatings, often desired in reactor design, can be obtained by the methods outlined in the above-mentioned copending application.

Many combinations of thermally stable compounds or mixtures of fissionable and non-fissionable materials can be used with different cladding metals; the composition of the fuel element will, however, vary with the temperatures, pressures and other variables which will be specified in the particular end use of the fuel element. Mixtures of non-fissionable and fissionable materials are usually used for increased structural strength. However, mixtures composed solely of fissionable materials can be used if desired.

Further variations within the scope and sphere of the invention will be apparent to those skilled in the art and it is our intention not to be limited to the embodiments shown but rather only to the invention itself as defined in the claims which follow.

We claim:
1. In a method of forming a fuel element, the steps of first electrophoretically depositing a porous coating of fissionable material out of liquid media on the surface of a cladding member, and thereafter electrolytically depositing bonding metal through the pores of said coating to bond said coating to said surface.

2. In a method of forming a fuel element, the steps of first electrophoretically depositing a porous coating comprising a mixture of fissionable and non-fissionable material out of organic media on the surface of a cladding member and thereafter electrolytically depositing bonding metal through the pores of said coating to bond said coating to said surface.

3. In the method as set forth in claim 2, the further step of covering said bonded coating with a solid member of cladding metal.

4. In the method as set forth in claim 2, the further step of electrolytically depositing a cladding layer of bonding metal on top of said bonded coating.

5. In the method set forth in claim 4, the further step of stripping said coating and cladding layer of bonding metal from said cladding member and electrolytically depositing bonding metal on top of the uncladded surface of said coating.

6. A fuel element comprising a first layer of cladding metal; a porous electrophoretically deposited coating of fissionable material covering a selected surface of said first layer; and a second layer of cladding metal covering said coating and extending through the pores thereof to make contact with said first layer.

7. A fuel element comprising first and second cladding layers of bonding metal; and a porous electrophoretically deposited coating of mixed fissionable and non-fissionable materials interposed between said layers, the pores of said coating being filled with said bonding metal.

8. The method of forming a fuel element comprising the steps of first electrophoretically depositing a porous coating of fissionable uranium dioxide out of organic media on to the surface of a stainless steel plate; thereafter electrolytically depositing nickel through the pores of said coating to bond said coating to said plate and continuing said deposition until said coating is completely covered with nickel.

9. A fuel element comprising a first layer of cladding metal; a porous electrophoretically-deposited coating of fissionable uranium dioxide covering a selected surface of said first layer; and a second layer of nickel cladding metal covering said coating and extending through the pores thereof to make contact with said first layer.

10. A fuel element comprising first and second cladding layers of metallic nickel; and a porous electrophoretically-deposited coating of mixed fissionable uranium dioxide and non-fissionable material interposed between said layers, the pores of the coating being filled with said metallic nickel.

References Cited in the file of this patent

UNITED STATES PATENTS

| 1,837,050 | Janbert | Dec. 15, 1931 |
| 2,191,666 | Kieffer | Feb. 27, 1940 |
| 2,626,457 | Lieberman | Jan. 27, 1953 |
| 2,686,439 | Tobert | Aug. 17, 1954 |
| 2,813,073 | Saller et al. | Nov. 12, 1957 |

FOREIGN PATENTS

| 289,509 | Great Britain | Nov. 23, 1927 |
| 325,317 | Great Britain | Feb. 20, 1930 |
| 539,162 | Germany | Nov. 21, 1931 |
| 470,604 | Canada | Jan. 2, 1951 |

OTHER REFERENCES

Angier et al.: U. S. Atomic Energy Comm., SEP-6 October 29, 1948, pp. 3-7. Available from Technical Information Services, Oak Ridge, Tenn.